April 5, 1927. 1,623,404
C. GIRL
AUTOMOBILE BUMPER
Filed June 27, 1925    2 Sheets-Sheet 1
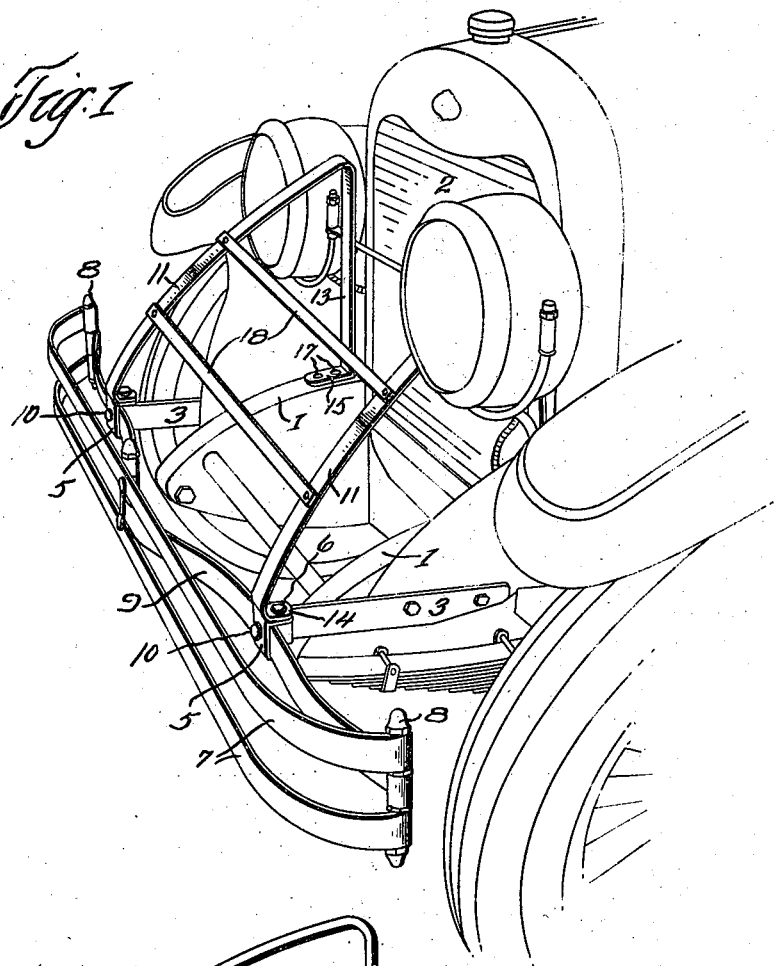
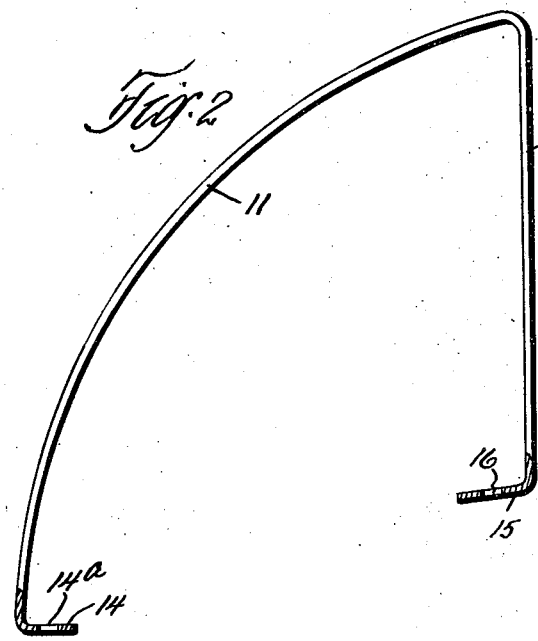
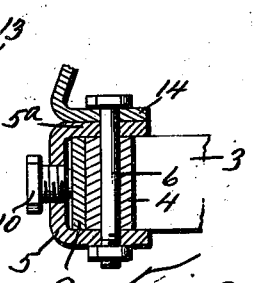
Inventor
Christian Girl,
By Hull, Brock & West,
Attorneys April 5, 1927. 1,623,404
C. GIRL
AUTOMOBILE BUMPER
Filed June 27, 1925   2 Sheets-Sheet 2
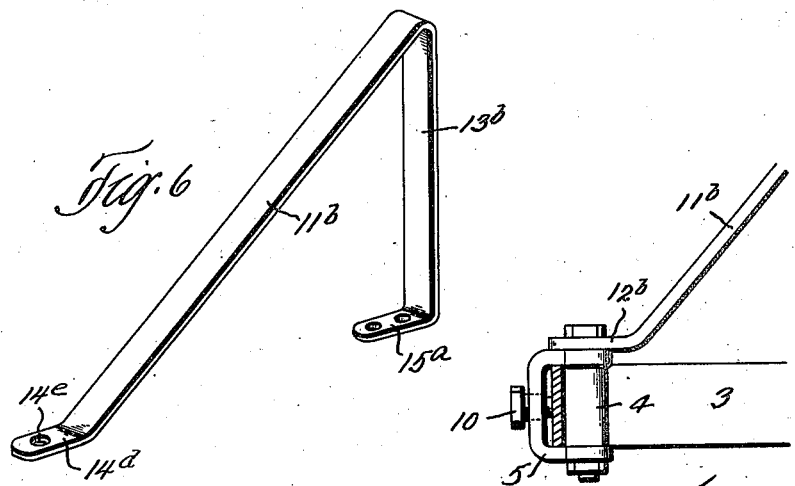
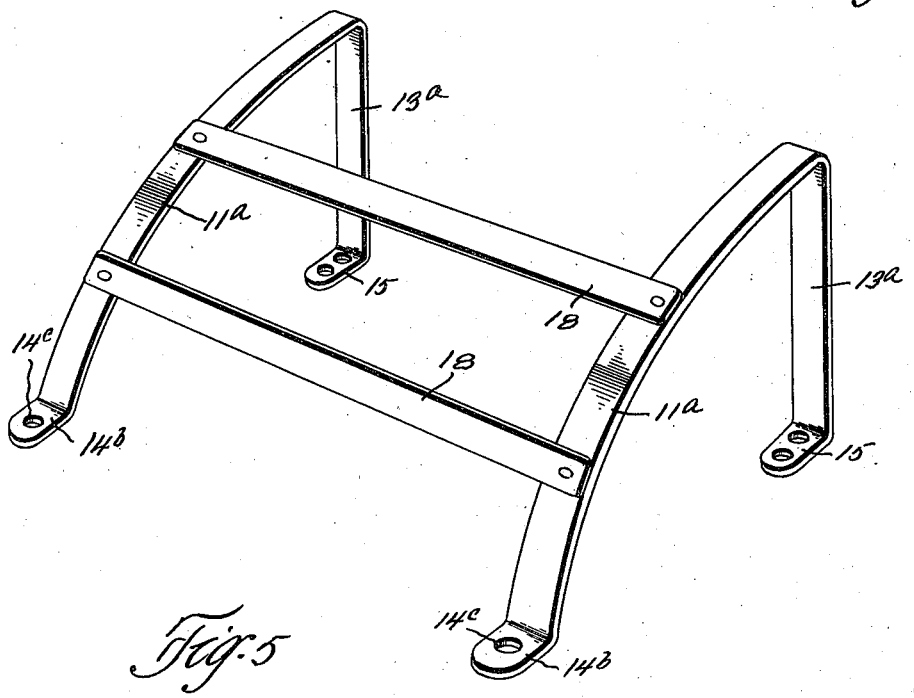

Patented Apr. 5, 1927.

1,623,404

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed June 27, 1925. Serial No. 39,912.

This invention relates to bumpers, and more particularly to guards or bumpers that are intended for the protection of the ends of automobiles and especially the front ends and radiators of such vehicles. The general object of the invention is to provide a bumper which may be conveniently attached to and removed from its supporting members and which, when in place, will serve to protect such end of the automobile from injury.

A further object of the invention is to provide a bumper of this character which will be efficient for the purpose for which it is designed; also a bumper which, while capable of and adapted for use with a radiator is also capable of cooperating and is arranged to cooperate with the transverse bumper, usually provided at the end of the car to form therewith a complete protection for such end.

Other and more limited objects of the invention will appear in the specification and are realized through the construction shown in the drawings, wherein Fig. 1 represents a perspective view of the front of an automobile having my invention applied thereto; Fig. 2 is a side elevation of one of the side bars of the radiator guard or bumper shown in the preceding view; Fig. 3, a detail in section, and Fig. 4 a detail in plan, showing the manner of supporting the front ends of the radiator guard or bumper; Fig. 5, a view in perspective of a somewhat modified view of the guard or bumper shown in Fig. 1; Fig. 6, a view in perspective of a further modified form of my invention, and Fig. 7, a sectional elevation showing the manner of supporting the front ends of the guards or bumpers shown in Figs. 5 and 6.

The bumper or guard structure shown herein is applied to the front of the automobile; hence the terms "front" and "rear" will be employed in the description and some of the claims as a matter of convenience of designation, but without any intention of limiting the application of the said structure to any particular end of the automobile.

Describing the various parts by reference characters and in connection with Figs. 1 to 4 inclusive, 1 denotes the front ends of the side members of an automobile and 2 the radiator thereof. 3 denotes an arm secured to each side member 1, each arm being provided at its front end with an eye 4. The arms 3 support, through U-shaped clamps 5 and vertical pivot bolts 6, a bumper which may be of any approved construction, the one shown herein being of the type shown, described and claimed in McGregor Patent No. 1,372,154, issued March 22, 1921, and comprising a pair of front bars 7, vertically spaced and connected at their ends by bolts 8 with the ends of the rear bar 9, which rear bar has its center projected between and connected to the centers of the bars 7. The bumper thus far described is supported by the arms 3 and the clamps 5 by slipping the clamps over the rear bar 9 and then inserting the pivot bolts 6 in place, after which the bar 9 may be forced against the fronts of the eyes 4 by means of set screws 10.

Cooperating with the bumper just described is an upwardly and rearwardly extending guard or bumper having its front end supported by the clamps 5 and bolts 6 while its rear end is supported directly from the frame members 1. This guard or bumper comprises generally a pair of side bars comprising each an upwardly and rearwardly curved front member 11 and a leg member 13, the front member having a foot 14 provided with an aperture 14$^a$ for the reception of a bolt 6. The foot 14 of each side bar is adapted to rest on top of the upper horizontal arm 5$^a$ of a clamp 5. Each leg member 13 has at its bottom a forwardly extending foot 15 provided with one or more apertures 16 by means of which the foot may be secured to the top of the corresponding side member 1, as by means of bolts or rivets 17.

The members 11 are of such length as to extend from the fronts of the arms 3 to substantially the plane of the front of the radiator 2.

In order to add strength to this radiator-bumper structure as well as to afford additional protection to the radiator, it is preferred to unite the side members 11 by means of cross bars 18, the said cross bars being preferably arranged parallel with each other and extending horizontally across the members 11.

In Fig. 5 there is shown a modification of my invention wherein the distance between the front ends of the side members 11$^a$ and the legs 13$^a$ is less than is the case with the bumpers shown in the preceding views. In this form of my invention, each side member 11ª is provided with a forwardly projecting foot 14ᵇ having an opening 14ᶜ therethrough for securing the feet to the clamps 5 and thereby to the arms 3.

In Figs. 6 and 7 there is shown a modification of the side bars of the rearwardly and vertically extending bumper, wherein the side members 11ᵇ are straight, instead of curved, and the cross bars 18 are omitted. Each side bar comprises the upwardly and rearwardly inclined member 11ᵇ with the vertical depending leg member 13ᵇ having the forwardly extending foot 15ª. At the bottom of each member 11ᵇ is a forwardly projecting foot 14ᵈ having an opening 14ᵉ therethrough, the foot 14ᵈ being adapted to rest on the clamp 5, as shown in Fig. 7.

The construction shown and described herein affords complete protection to the front of the vehicle from and including the part protected by the bumper 7–9, inclusive, rearwardly and upwardly including the upper part of the radiator 2.

In each of the three forms of radiator or end guard or bumper shown herein, each of the side bars is generally in the shape of two sides of a triangle, each leg or side having a foot for attachment.

While the bumper structure shown herein is described and illustrated as applied to the front of an automobile, for the protection of such front, including the radiator, it will be obvious that a similar construction may, in some instances, be useful at the rear end of an automobile. Hence, I do not propose to limit my invention solely to the use of my structure in connection with the front and radiator of an automobile. Furthermore, through each of the constructions shown and described herein, I have provided a bumper structure that will protect the entire end of a car or automobile; also a single guard or bumper which is particularly useful for the protection of parts, such as radiators, located above the zones protected by the usual transverse bumpers.

Having thus described my invention, what I claim is:—

1. The combination, with the side members and radiator of an automobile, of a bumper extending across the front of the automobile below the upper portion of said radiator, a guard or bumper extending upwardly and rearwardly with respect to the first-mentioned bumper and providing a protection for the part of the radiator above the first-mentioned bumper, and means carried by the side members for supporting both of the aforesaid bumpers in operative relation to the radiator and the front of the automobile.

2. The combination, with the side members and radiator of an automobile, of an arm secured to and projecting forwardly from each of the said side members, a bumper extending across the front of the automobile below the upper portion of said radiator, a guard or bumper extending upwardly and rearwardly with respect to the first-mentioned bumper and providing a protection for the radiator above such first-mentioned bumper, and means connecting the first-mentioned bumper and the lower portion of the said guard or bumper to the said arms.

3. The combination, with the side members and radiator of an automobile, of arms secured to and projecting forwardly from the said side members, a bumper secured to said arms and extending transversely of the said members, and a guard or bumper comprising a pair of side bars each having its front and lower end supported by one of said arms, the said side bars extending upwardly and rearwardly and each having at its upper end a supporting member by which such rear and upper end is attached to and supported from a side member.

4. The combination, with the frame of an automobile, of arms secured to and projecting from the said frame, a bumper secured to said arms and extending transversely of the said frame, and a guard or bumper comprising a pair of side bars each having its lower end supported by one of said arms, the said side bars extending upwardly and away from the first bumper and each having at its upper end a supporting member by which such end is attached to and supported from the said frame.

5. The combination, with the side members and radiator of an automobile, of an arm secured to and projecting forwardly from each side member, a bumper for the front of the automobile, clamps securing the said bumper to the forward ends of said arms, and a radiator guard or bumper comprising a pair of side bars each having a foot at its front end adapted to rest upon a clamp and be secured therewith to the corresponding arm, and means for supporting the upper ends of the side bars from the side members of the automobile.

6. The combination, with the frame of an automobile, of arms secured to and projecting forwardly from such frame, a bumper, clamps securing the said bumper to the ends of said arms, and a guard or bumper comprising a pair of side bars each having a foot at one end adapted to be clamped to the corresponding arm, and means for supporting the upper ends of the side bars from the frame of the automobile.

7. The combination, with the side members and radiator of an automobile, of an arm secured to and projecting forwardly from each side member, a bumper secured to said arms and extending transversely of the frame, a guard or bumper comprising a pair of side bars each secured at its front end to one of said arms and each extending upwardly and rearwardly therefrom, and supporting members depending from the upper ends of the said arms and supporting the same from the side members.

8. The combination, with the frame of an automobile, of arms secured to and projecting from said frame, a bumper secured to said arms and extending transversely of the frame, a guard or bumper comprising a pair of side bars each secured at an end to one of said arms and each extending upwardly therefrom, and supporting members depending from the upper ends of the said bars and supporting the same from the frame.

9. The combination, with the side members and radiator of an automobile, of an arm secured to and projecting forwardly from each side member, a bumper secured to said arms and extending transversely of the automobile frame, and a bumper comprising a pair of side bars each secured at its front end to one of said arms and each extending upwardly and rearwardly therefrom, supporting members depending from the upper ends of the said bars and supporting the same from the side members, and one or more cross bars secured to the said side bars.

10. A bumper structure for the end of an automobile, said structure comprising a transversely extending lower bumper, a pair of side bars extending upwardly and away from the said bumper, and means for supporting the upper ends of said bars from the said automobile.

11. A bumper structure for an end of an automobile, said structure comprising a transversely extending lower bumper and a pair of side bars extending upwardly and away from the said bumper, the upper ends of the side bars being provided with legs for supporting the same from the side members of the automobile, and one or more transverse bars connecting the said side bars.

12. A bumper for an end of an automobile comprising a pair of side members each having a foot at its lower end, each of the side members extending upwardly and away from its foot and in the direction of the length of the automobile, the upper end of each side member being provided with a leg member for supporting the same from a frame member of the vehicle.

13. A bumper for an end of an automobile comprising a pair of side members each having a foot at its lower end, each of the side members extending upwardly and away from its foot and in the direction of the length of the automobile, the upper end of each side member being provided with a leg member for supporting the same from a frame member of the vehicle, and one or more bars connecting the said side members.

14. The combination, with the side members of a vehicle, of an arm attached to and projecting from each side member, in the direction of the length thereof, a guard or bumper comprising a pair of side bars each having its lower end supported from an arm and extending upwardly from such point of support and in the direction of the length of the side members, means supporting the upper ends of the bars from the side members, and one or more cross bars connecting the side bars.

15. A guard or bumper comprising a pair of side members each having a foot at one end thereof and a leg member depending from the opposite end and provided with a foot, and one or more cross bars connecting the side members.

16. A guard or bumper comprising a pair of upwardly extending side bars each having a foot at one end thereof and a leg depending from the opposite end and provided with a foot.

In testimony whereof, I hereunto affix my signature.

CHRISTIAN GIRL.